(12) United States Patent
Yamauchi et al.

(10) Patent No.: US 11,339,244 B2
(45) Date of Patent: May 24, 2022

(54) BLOCKED POLYISOCYANATE COMPOSITION, ONE-COMPONENT COATING COMPOSITION, COATING FILM, AND COATED ARTICLE

(71) Applicant: ASAHI KASEI KABUSHIKI KAISHA, Tokyo (JP)

(72) Inventors: Masakazu Yamauchi, Tokyo (JP); Satoshi Takeno, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/937,980

(22) Filed: Jul. 24, 2020

(65) Prior Publication Data
US 2020/0354508 A1 Nov. 12, 2020

Related U.S. Application Data

(62) Division of application No. 16/086,454, filed as application No. PCT/JP2017/008942 on Mar. 7, 2017, now abandoned.

(30) Foreign Application Priority Data

Mar. 29, 2016 (JP) .............................. JP2016-065941

(51) Int. Cl.
| | |
|---|---|
| *C08G 18/80* | (2006.01) |
| *C09D 175/04* | (2006.01) |
| *C08G 18/20* | (2006.01) |
| *C08G 18/78* | (2006.01) |
| *C08G 18/79* | (2006.01) |
| *C08G 18/18* | (2006.01) |
| *C08G 18/02* | (2006.01) |
| *C08G 18/16* | (2006.01) |
| *C08G 18/62* | (2006.01) |

(52) U.S. Cl.
CPC ....... *C08G 18/8048* (2013.01); *C08G 18/022* (2013.01); *C08G 18/027* (2013.01); *C08G 18/168* (2013.01); *C08G 18/18* (2013.01); *C08G 18/2072* (2013.01); *C08G 18/2081* (2013.01); *C08G 18/6216* (2013.01); *C08G 18/7837* (2013.01); *C08G 18/7887* (2013.01); *C08G 18/792* (2013.01); *C08G 18/798* (2013.01); *C08G 18/807* (2013.01); *C08G 18/8064* (2013.01); *C08G 18/8093* (2013.01); *C08G 18/8096* (2013.01); *C09D 175/04* (2013.01)

(58) Field of Classification Search
CPC .......... C08G 18/2072; C08G 18/027; C08G 18/807; C08G 18/18; C08G 18/22; C08G 18/798; C08G 18/6216; C08G 18/8093; C08G 18/7887; C08G 18/8064; C08G 18/8048; C08G 18/2081; C08G 18/7837; C08G 18/8096; C08G 18/168; C08G 18/792; C09D 175/04
See application file for complete search history.

(56) References Cited

U.S. PATENT DOCUMENTS

| | | | |
|---|---|---|---|
| 4,373,081 A | 2/1983 | Nachtkamp et al. | |
| 6,583,216 B1 | 6/2003 | Konig et al. | |
| 10,604,673 B2 | 3/2020 | Takeno et al. | |
| 2002/0151671 A1* | 10/2002 | Richter ................. | C08G 18/09 528/45 |
| 2002/0165335 A1 | 11/2002 | Kobata et al. | |
| 2005/0070683 A1 | 3/2005 | Thiebes et al. | |
| 2006/0276611 A1 | 12/2006 | Katamura et al. | |
| 2015/0322290 A1* | 11/2015 | Shigemori ............ | C08G 18/80 428/423.3 |
| 2016/0369034 A1* | 12/2016 | Fukuchi ............... | C08G 18/807 |

FOREIGN PATENT DOCUMENTS

| | | |
|---|---|---|
| CN | 107922584 A | 4/2018 |
| EP | 0 096 210 | 12/1983 |
| EP | 0 159 117 | 10/1985 |
| JP | S57-121065 | 7/1982 |
| JP | S59-4658 | 1/1984 |
| JP | H08-225630 | 9/1996 |
| JP | H08-325353 | 12/1996 |
| JP | H09-255915 | 9/1997 |
| JP | H11-246646 | 9/1999 |
| JP | 2000-290493 | 10/2000 |
| JP | 2002-322238 | 11/2002 |

(Continued)

OTHER PUBLICATIONS

International Search Report issued with respect to Patent Application No. PCT/JP2017/008942, dated May 9, 2017.
International Preliminary Report on Patentability issued with respect to Patent Application No. PCT/JP2017/008942, dated Oct. 2, 2018.
Supplementary European Search Report with respect to EP Application No. 17774104.8, dated Mar. 22, 2019.

*Primary Examiner* — Shane Fang
(74) *Attorney, Agent, or Firm* — Greenblum & Bernstein, P.L.C.

(57) ABSTRACT

The present invention provides a blocked polyisocyanate composition comprising a blocked polyisocyanate formed through blocking at least a part of isocyanate groups possessed by a polyisocyanate derived from one or two or more diisocyanates selected from the group consisting of an aliphatic diisocyanate and an alicyclic diisocyanate with an active methylene-based compound comprising a malonic acid diester, wherein a specific molar ratio calculated from contents (mol %) of isocyanurate groups, iminooxadiazinedione groups, uretdione groups, and allophanate groups is 0.05 or more and 0.60 or less.

7 Claims, No Drawings

(56) References Cited

FOREIGN PATENT DOCUMENTS

| | | |
|---|---|---|
| JP | 2003-508562 | 3/2003 |
| JP | 2005-54121 | 3/2005 |
| JP | 2006-324014 | 11/2006 |
| JP | 2006-335954 | 12/2006 |
| JP | 2007-507890 | 2/2007 |
| JP | 2013-224350 | 10/2013 |
| JP | 2013-237726 | 11/2013 |
| WO | 2014/208567 | 12/2014 |

* cited by examiner

BLOCKED POLYISOCYANATE COMPOSITION, ONE-COMPONENT COATING COMPOSITION, COATING FILM, AND COATED ARTICLE

CROSS-REFERENCE TO RELATED APPLICATIONS

This is a divisional application of U.S. patent application Ser. No. 16/086,454, filed on Sep. 19, 2018 which is a U.S National stage of International Patent Application No. PCT/JP2017/008942, filed on Mar. 7, 2017 which claims priority to Japanese Patent Application No. 2016-065941, filed on Mar. 29, 2016. The disclosure of each of these applications is herein incorporated by reference in its entirety.

TECHNICAL FIELD

The present invention relates a blocked polyisocyanate composition, a one-component coating composition, a coating film, and a coated article.

BACKGROUND ART

Polyisocyanate compositions as with melamine-based curing agents are widely used as thermally crosslinkable curing agents for baking finishes. In recent years, it is pointed out that formalin is produced when a melamine-based curing agent is used, and polyisocyanates that are blocked with a blocking agent (blocked polyisocyanates) attract attention from the viewpoint of global environment, safety, health, and the like.

Oximes, phenols, alcohols, and lactams are known as blocking agents of blocked polyisocyanates. Blocked polyisocyanate compositions formed with such blocking agents generally require a high baking temperature of 140° C. or higher, thus resulting in extremely high energy costs. For processing on plastics having poor heat resistance, there is a restriction that blocked polyisocyanate compositions requiring high-temperature backing cannot be used.

A pyrazole-based blocked polyisocyanate composition (see, for example, Patent Literature 1) and an aliphatic secondary amine-based blocked polyisocyanate composition (see, for example, Patent Literature 2) are disclosed as blocked polyisocyanates capable of forming crosslinked coating films at relatively low temperatures.

A blocked polyisocyanate composition having a malonic acid diester as a blocking agent (see, for example, Patent Literature 3), blocked polyisocyanate compositions having diethyl malonate and ethyl acetoacetate as blocking agents (see, for example, Patent Literatures 4 and 5), a blocked polyisocyanate composition having diisopropyl malonate as a blocking agent (see, for example, Patent Literature 6), and the like are disclosed as blocked polyisocyanate compositions enabling the baking temperature to be further lowered.

CITATION LIST

Patent Literature

Patent Literature 1: European Patent Application Publication No. 159117
Patent Literature 2: Japanese Patent Laid-Open No. 59-4658
Patent Literature 3: Japanese Patent Laid-Open No. 57-121065
Patent Literature 4: Japanese Patent Laid-Open No. 8-225630
Patent Literature 5: Japanese Patent Laid-Open No. 9-255915
Patent Literature 6: Japanese Patent Laid-Open No. 2006-335954

SUMMARY OF INVENTION

Technical Problem

Blocked polyisocyanate compositions as described in Patent Literatures 1 and 2, although being curable at a relatively low temperature, require a baking temperature of about 120° C., and an even lower baking temperature is desired.

When an article is coated with a blocked polyisocyanate composition, coating films are layered in general. In this case, a coating film such as a clear layer may be further layered on top of the coating film layers using the blocked polyisocyanate composition, and a blocked polyisocyanate composition that has good adhesion when layered, and a one-component coating composition containing such a composition are desired.

Blocked polyisocyanate compositions described in Patent Literatures 3 to 6 are capable of forming crosslinked coating films at a temperature of 100° C. or lower, but still have a problem with adhesion when a coating film is further layered on top of coating film layers using these blocked polyisocyanate compositions, and compatibility with some polyols.

Further, some blocked polyisocyanate compositions are insufficient in compatibility with some polyols, and cause turbidity in a coating film particularly when being used as a curing agent for a clear coating material. Thus, blocked polyisocyanate compositions having excellent compatibility with polyols are required.

Accordingly, an object of the present invention is to provide a blocked polyisocyanate composition having excellent adhesion to an upper-layer coating film and having excellent compatibility with polyols while retaining low-temperature curability.

Solution to Problem

As a result of having conducted diligent research, the inventors found that a blocked polyisocyanate composition containing a blocked polyisocyanate having a specific structure, wherein the molar amounts of isocyanurate groups, iminooxadiazinedione groups, uretdione groups, and allophanate groups contained satisfy a given relation, has excellent adhesion to an upper-layer coating film and has excellent compatibility with polyols while retaining low-temperature curability, and thus accomplished the present invention.

That is to say, the present invention has the following configurations.

[1]

A blocked polyisocyanate composition comprising a blocked polyisocyanate formed through blocking at least a part of isocyanate groups possessed by a polyisocyanate derived from one or two or more diisocyanates selected from the group consisting of an aliphatic diisocyanate and an alicyclic diisocyanate with an active methylene-based compound comprising a malonic acid diester, wherein a specific molar ratio represented by formula (1) is 0.05 or more and 0.60 or less:

$$\text{specific molar ratio} = (B+C+D)/(A+B+C+D) \quad (1)$$

wherein A represents a content (mol %) of isocyanurate groups represented by formula (I); B represents a content (mol %) of iminooxadiazinedione groups represented by formula (II); C represents a content (mol %) of uretdione groups represented by formula (III); and D represents a content (mol %) of allophanate groups represented by formula (IV).

[2]
The blocked polyisocyanate composition according to [1], wherein the blocked polyisocyanate composition comprises a component having a number average molecular weight of 1500 or less in a content of 55 mass % or more and 80 mass % or less based on a total amount of the blocked polyisocyanate composition.
[3]
The blocked polyisocyanate composition according to [1] or [2], wherein the malonic acid diester compound comprises diethyl malonate.
[4]
The blocked polyisocyanate composition according to any of [1] to [3], wherein the malonic acid diester compound comprises diisopropyl malonate.
[5]
The blocked polyisocyanate composition according to any of [1] to [4], wherein the active methylene-based compound further comprises a β-ketoester compound.
[6]
The blocked polyisocyanate composition according to [5], wherein the β-ketoester compound comprises ethyl acetoacetate.
[7]
The blocked polyisocyanate composition according to any of [1] to [6], further comprising a monohydric alcohol.
[8]
The blocked polyisocyanate composition according to any of [1] to [7], wherein the diisocyanates comprise hexamethylene diisocyanate.

[9]
A one-component coating composition comprising the blocked polyisocyanate composition according to any of [1] to [8], and a polyvalent active hydrogen compound.
[10]
A coating film formed of the one-component coating composition according to [9].
[11]
A coated article comprising the coating film according to [10].
[12]
A method for producing a composite coating film, the method comprising a step of coating with a first coating material solution comprising the one-component coating composition according to [9] to form a first coating film; and a step of coating the first coating film with a second coating material solution to form a second coating film.
[13]
A composite coating film comprising a first coating film formed of the one-component coating composition according to [9], and a second coating film on the first coating film.

Advantageous Effects of Invention

The blocked polyisocyanate composition according to the present invention is capable of forming a crosslinked coating film at a temperature equal to or lower than 100° C., has excellent adhesion to an upper-layer coating film, and has excellent compatibility with polyols.

DESCRIPTION OF EMBODIMENT

Below, an embodiment for carrying out the present invention (hereinafter simply referred to as "the present embodiment") will now be described in detail. The present embodiment below is an example to describe the present invention, and is not intended to limit the present invention to the following contents. Various modifications can be made within the scope of the invention.
[Blocked Polyisocyanate Composition]
The blocked polyisocyanate composition of the present embodiment contains a blocked polyisocyanate formed through blocking at least a part of isocyanate groups possessed by a polyisocyanate derived from one or two or more diisocyanates selected from the group consisting of an aliphatic diisocyanate and an alicyclic diisocyanate with an active methylene-based compound containing a malonic acid diester. In the blocked polyisocyanate composition, the specific molar ratio represented by formula (1) below (hereinafter, also referred to as "specific molar ratio", simply) is 0.05 or more and 0.60 or less:

$$\text{specific molar ratio}=(B+C+D)/(A+B+C+D) \quad (1)$$

wherein A represents the content (mol %) of isocyanurate groups represented by formula (I) below (hereinafter, also referred to as "isocyanurate groups", simply); B represents the content (mol %) of iminooxadiazinedione groups represented by formula (II) below (hereinafter, also referred to as "iminooxadiazinedione groups", simply); C represents the content (mol %) of uretdione groups represented by formula (III) below (hereinafter, also referred to as "uretdione groups", simply); and D represents the content (mol %) of allophanate groups represented by formula below (IV) (hereinafter, also referred to as "allophanate groups", simply).

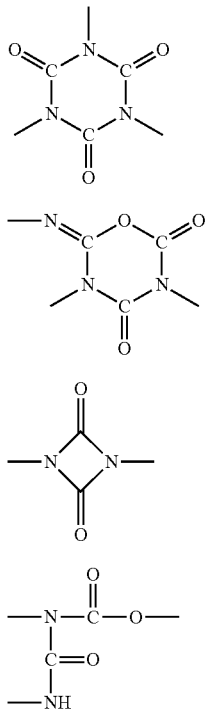

The lower limit of the specific molar ratio is preferably 0.08, more preferably 0.12, even more preferably 0.15, yet more preferably 0.18, and far more preferably 0.20. The upper limit of the specific molar ratio is preferably 0.50, more preferably 0.45, even more preferably 0.40, yet more preferably 0.37, and far more preferably 0.35. When the specific molar ratio is 0.05 or more, excellent compatibility with polyols can be exhibited. When the specific molar ratio is 0.60 or less, the low-temperature curability can be maintained. In order to obtain a blocked polyisocyanate composition having a specific molar ratio of 0.05 or more and 0.60 or less, a method involving adjustment of the specific molar ratio through an iminooxadiazinedione formation reaction, a uretdione formation reaction, or an allophanate formation reaction that will be described below to form an iminooxadiazinedione group, a uretdione group, or an allophanate group or other methods may be used.

The molar ratio of iminooxadiazinedione groups is preferably 0.05 or more and 0.60 or less as a molar ratio of B/(A+B+C+D) (A to D have the same definitions as A to D in formula (1) above). The lower limit of the molar ratio is more preferably 0.08, even more preferably 0.12, yet more preferably 0.15, and far more preferably 0.18. The upper limit of the molar ratio is more preferably 0.50, even more preferably 0.45, yet more preferably 0.40, and far more preferably 0.37. When the molar ratio is 0.05 or more, there is a tendency that superior compatibility with polyols can be exhibited. When the molar ratio is 0.60 or lower, there is a tendency that the low-temperature curability can be more reliably maintained. It is more preferable from the viewpoint of imparting high hardness to a coating film using the blocked polyisocyanate composition of the present embodiment that the molar ratio be 0.50 or less. In order to obtain a blocked polyisocyanate composition having a molar ratio of 0.05 or more and 0.60 or less, a method involving adjustment of the molar ratio through an iminooxadiazinedione formation reaction that will be described below to form an iminooxadiazinedione group or other methods may be used.

The molar ratio of uretdione groups is preferably 0.05 or more and 0.60 or less as a molar ratio of C/(A+B+C+D) (A to D have the same definitions as A to D in formula (1) above). The lower limit of the molar ratio is more preferably 0.08, even more preferably 0.12, yet more preferably 0.15, and far more preferably 0.18. The upper limit of the molar ratio is more preferably 0.50, even more preferably 0.45, yet more preferably 0.40, and far more preferably 0.37. When the molar ratio is 0.05 or more, there is a tendency that superior compatibility with polyols can be exhibited. When the molar ratio is 0.60 or lower, there is a tendency that the low-temperature curability can be more reliably maintained. It is more preferable from the viewpoint of imparting high hardness to a coating film using the blocked polyisocyanate composition of the present embodiment that the molar ratio be 0.50 or less. In order to obtain a blocked polyisocyanate composition having a molar ratio of 0.05 or more and 0.60 or less, a method involving adjustment of the molar ratio through a uretdione formation reaction that will be described below to form a uretdione group or other methods may be used.

The molar ratio of allophanate groups is preferably 0.05 or more and 0.60 or less as a molar ratio of D/(A+B+C+D) (A to D have the same definitions as A to D in formula (1) above). The lower limit of the molar ratio is more preferably 0.08, even more preferably 0.12, yet more preferably 0.15, and far more preferably 0.18. The upper limit of the molar ratio is more preferably 0.50, even more preferably 0.45, yet more preferably 0.40, and far more preferably 0.37. When the molar ratio is 0.05 or more, there is a tendency that superior compatibility with polyols can be exhibited. When the molar ratio is 0.60 or lower, there is a tendency that the low-temperature curability can be more reliably maintained. It is more preferable from the viewpoint of imparting high hardness to a coating film using the blocked polyisocyanate composition of the present embodiment that the molar ratio be 0.50 or less. In order to obtain a blocked polyisocyanate composition having a molar ratio of 0.05 or more and 0.60 or less, a method involving adjustment of the molar ratio through an allophanate formation reaction that will be described below to form an allophanate group or other methods may be used.

To adjust the specific molar ratio ((B+C+D)/(A+B+C+D)), the molar ratio of iminooxadiazinedione groups (B/(A+B+C+D)), the molar ratio of uretdione groups (C/(A+B+C+D)), and the molar ratio of allophanate groups (D/(A+B+C+D)) within the above-described ranges, a method that will be described below in [Method for producing polyisocyanate] may be appropriately applied to adjust the molar ratios corresponding to them in a polyisocyanate. The specific molar ratio ((B+C+D)/(A+B+C+D)), the molar ratio of iminooxadiazinedione groups (B/(A+B+C+D)), the molar ratio of uretdione groups (C/(A+B+C+D)), and the molar ratio of allophanate groups (D/(A+B+C+D)) can be measured by the method described in the Examples below.

It is preferable for the blocked polyisocyanate composition of the present embodiment to contain a component having a number average molecular weight of 1500 or less in a content of 55 mass % or more and 80 mass % or less based on the total amount (100 mass %) of the blocked polyisocyanate composition. The lower limit of the content of a component having a number average molecular weight of 1500 or less is more preferably 56 mass %, even more preferably 58 mass %, and yet more preferably 60 mass %.

The upper limit of the content of a component having a number average molecular weight of 1500 or less is more preferably 78 mass %, even more preferably 76 mass %, and yet more preferably 74 mass %. When the content is 55 mass % or more, there is a tendency that a better adhesion to an upper-layer coating film and a better compatibility with polyols can be attained. When the content is 80 mass % or less, there is a tendency that superior curability can be attained. The content can be measured by the method described in the Examples below.

The average number of isocyanate groups of the blocked polyisocyanate composition of the present embodiment is preferably 2.0 or more and 6.0 or less. The lower limit of the average number of isocyanate groups is more preferably 2.2, even more preferably 2.4, yet more preferably 2.6, and far more preferably 2.8. The upper limit of the average number of isocyanate groups is more preferably 5.0, even more preferably 4.0, yet more preferably 3.7, and far more preferably 3.4. When the average number of isocyanate groups is 2.0 or more, the crosslinkability can be maintained. When the average number of isocyanate groups is 6.0 or less, there is a tendency that a better compatibility with polyols can be attained and the viscosity of the blocked polyisocyanate composition can be adjusted within a more suitable range. The average number of isocyanate groups can be measured by the method described in the Examples below.

The effective isocyanate group content (hereinafter also referred to as "effective NCO content") of the blocked polyisocyanate composition of the present embodiment is preferably 1.0 mass % or more and 20 mass % or less based on the total amount (100 mass %) of the blocked polyisocyanate composition. The lower limit of the effective NCO content is more preferably 2.0 mass %, even more preferably 4.0 mass %, and yet more preferably 8.0 mass %. The upper limit of the effective NCO content is more preferably 18 mass %, even more preferably 16 mass %, and far more preferably 14 mass %. When the effective NCO content is 1.0 mass % or more, there is a tendency that a better curability can be attained. When the effective NCO content is 20 mass % or less, there is a tendency that a better compatibility with the other components can be attained. The effective NCO content can be measured by the method described in the Examples below.

The solids concentration of the blocked polyisocyanate composition of the present embodiment is preferably 40 mass % or more and 90 mass % or less based on the total amount (100 mass %) of the blocked polyisocyanate composition. The lower limit of the solids concentration is more preferably 45 mass %, even more preferably 50 mass %, and yet more preferably 55 mass %. The upper limit of the solids concentration is more preferably 85 mass %, even more preferably 80 mass %, and yet more preferably 75 mass %. When the solids concentration is 40 mass % or more, there is a tendency that the solids content of a resulting one-component coating composition can be higher. When the solids concentration is 90 mass % or less, there is a tendency that the handleability of the blocked polyisocyanate composition can be better in formulation of a one-component coating composition. The solids concentration can be measured by the method described in the Examples below.

[Polyisocyanate]

The polyisocyanate of the present embodiment can be obtained from one or two or more diisocyanates selected from the group consisting of an aliphatic diisocyanate and an alicyclic diisocyanate.

The aliphatic diisocyanate is not particularly limited, and is preferably an aliphatic diisocyanate having 4 or more and 30 or fewer carbon atoms, and examples include tetramethylene diisocyanate, pentamethylene diisocyanate, hexamethylene diisocyanate (hereinafter abbreviated as "HDI"), and 2,2,4-trimethyl-1,6-hexamethylene diisocyanate, and lysine diisocyanate. In particular, HDI is more preferable in terms of industrial availability. The above aliphatic diisocyanates may be used singly or in combinations of two or more.

The alicyclic diisocyanate is not particularly limited, and is preferably an alicyclic diisocyanate having 8 or more and 30 or fewer carbon atoms, and examples include isophorone diisocyanate (hereinafter abbreviated as "IPDI"), 1,3-bis (isocyanatomethyl)-cyclohexane, 4,4'-dicyclohexylmethane diisocyanate, norbornene diisocyanate, and hydrogenated xylylene diisocyanate. In particular, IPDI is more preferable in terms of weather resistance and industrial availability. The above alicyclic diisocyanates may be used singly or in combinations of two or more.

One or two or more of the aliphatic diisocyanates and one or two or more of the alicyclic diisocyanates may be used in combination.

The molar ratio, (B+C+D)/(A+B+C+D), of the polyisocyanate of the present embodiment is preferably 0.05 or more and 0.50 or less, from the viewpoint of easier adjustment of the specific molar ratio of the blocked polyisocyanate composition within the range of the present embodiment (A to D have the same definitions as A to D in formula (1) above).

The isocyanate content of the polyisocyanate of the present embodiment (hereinafter also referred to as "NCO content") is preferably 15 mass % or more and 30 mass % or less based on the total amount (100 mass %) of the polyisocyanate. The lower limit of the NCO content is more preferably 18 mass %, and even more preferably 20 mass %. The upper limit of the NCO content is more preferably 27 mass %, and even more preferably 25 mass %. When the NCO content is 15 mass % or more, there is a tendency that a better crosslinkability can be attained. When the NCO content is 30 mass % or less, there is a tendency that the diisocyanate monomer concentration by mass can be adjusted within a more suitable range. The NCO content can be measured by the method described in the Examples below.

The viscosity at 25° C. of the polyisocyanate of the present embodiment is preferably 100 mPa·s or more and 5000 mPa·s or less. The lower limit of the viscosity is more preferably 150 mPa·s, even more preferably 200 mPa·s, and yet more preferably 250 mPa·s. The upper limit of the viscosity is more preferably 4000 mPa·s, even more preferably 3000 mPa·s, and yet more preferably 2500 mPa·s. When the viscosity is 100 mPa·s or more, there is a tendency that a better crosslinkability can be attained. When the viscosity is 5000 mPa·s or less, there is a tendency that a better compatibility with polyols can be attained, and the viscosity of the blocked polyisocyanate composition to be formed can be adjusted within a more suitable range. The viscosity can be measured by the method described in the Examples below.

The number average molecular weight of the polyisocyanate of the present embodiment is preferably 300 or more and 1000 or less. The lower limit of the number average molecular weight is more preferably 350, even more preferably 400, and yet more preferably 450. The upper limit of the number average molecular weight is more preferably 900, even more preferably 800, and yet more preferably 700. When the number average molecular weight is 300 or more, there is a tendency that the crosslinkability can be more reliably maintained. When the number average molecular weight is 1000 or less, there is a tendency that a better compatibility with polyols can be attained, and the viscosity of the blocked polyisocyanate composition can be adjusted within a more suitable range. The number average molecular weight can be measured by the method described in the Examples below.

The average number of isocyanate groups of the polyisocyanate of the present embodiment is preferably 2.0 or more and 6.0 or less. The lower limit of the average number of isocyanate groups is more preferably 2.2, even more preferably 2.4, yet more preferably 2.6, and far more preferably 2.8. The upper limit of the average number of isocyanate groups is more preferably 5.0, even more preferably 4.0, yet more preferably 3.7, and far more preferably 3.4. When the average number of isocyanate groups is 2.0 or more, there is a tendency that the crosslinkability can be more reliably maintained. When the average number of isocyanate groups is 6.0 or less, there is a tendency that a better compatibility with polyols can be attained, and the viscosity of the blocked polyisocyanate composition can be adjusted within a more suitable range. The average number of isocyanate groups can be measured by the method described in the Examples below.

The diisocyanate monomer concentration by mass of the polyisocyanate of the present embodiment is preferably 1.0 mass % or less, more preferably 0.5 mass % or less, and even more preferably 0.3 mass % or less based on the total amount (100 mass %) of the polyisocyanate. When the diisocyanate monomer concentration by mass is 1.0 mass % or less, there is a tendency that a better crosslinkability can be attained. The diisocyanate monomer concentration by mass can be measured by the method described in the Examples below.

[Method for Producing Polyisocyanate]

A method for producing the polyisocyanate of the present embodiment will now be described. The polyisocyanate of the present embodiment can be obtained through production at once by an isocyanurate formation reaction to form an isocyanurate group derived from isocyanate groups, an iminooxadiazinedione formation reaction to form an iminooxadiazinedione group, a uretdione formation reaction to form a uretdione group, and an allophanate formation reaction to form an allophanate group in the presence of an excessive amount of a diisocyanate monomer and removal of the unreacted diisocyanate monomer after the completion of the reactions. Alternatively, the reactions may be separately performed to mix the resulting polyisocyanates at a particular ratio. Here, it is preferable to obtain a polyisocyanate through the reactions performed at once from the viewpoint of simplicity in production, and it is preferable to separately produce polyisocyanates and then mix them from the viewpoint of freely adjusting the molar ratios of the functional groups.

Examples of the catalyst to derive an isocyanurate group-containing polyisocyanate from a diisocyanate monomer include commonly used isocyanurate formation reaction catalysts. The isocyanurate formation reaction catalyst is not particularly limited, and is preferably a basic catalyst in general. Examples of such catalysts include (1) hydroxides of, and salts of organic weak acids such as acetates, octylates, myristates, and benzoates of, tetraalkylammoniums such as tetramethylammonium, tetraethylammonium, and tetrabutylammonium, (2) hydroxides of, and salts of organic weak acids such as acetates, octylates, myristates, and benzoates of, hydroxyalkylammoniums such as trimethylhydroxyethylammonium, trimethylhydroxypropylammonium, triethylhydroxyethylammonium, and triethylhydroxypropylammonium, (3) metal salts of tin, zinc, lead, and the like with alkylcarboxylic acids such as acetic acid, caproic acid, octylic acid, and myristic acid, (4) metal alcoholates of sodium, potassium, and the like, (5) aminosylyl group-containing compounds such as hexamethylenedisilazane, (6) Mannich bases, (7) tertiary amines and epoxy compounds used in combination, and (8) phosphorus-based compounds such as tributylphosphine.

In particular, salts of organic weak acids of quaternary ammoniums are preferable, and salts of organic weak acids of tetraalkylammoniums are more preferable, from the viewpoint of less possibility of generation of an unnecessary by-product.

The content of the above isocyanurate formation reaction catalyst is preferably 10 ppm by mass or more and 1000 ppm by mass or less based on the mass of a diisocyanate added. The upper limit is more preferably 500 ppm by mass, and even more preferably 100 ppm by mass.

The isocyanurate formation reaction temperature is preferably 50° C. or higher and 120° C. or lower, and more preferably 60° C. or higher and 90° C. or lower. When the reaction temperature is 120° C. or lower, there is a tendency that coloration or the like can be effectively suppressed, which is preferable.

At a desired conversion rate (a mass ratio of a polyisocyanate produced in the isocyanurate formation reaction to a diisocyanate monomer added), the isocyanurate formation reaction is terminated, for example, by addition of an acidic compound such as phosphoric acid and an acidic phosphate ester, but the substance to be added is not particularly limited. To obtain the polyisocyanate of the present embodiment, it is required to terminate the progression of the reaction in early stages. Since the reaction rate of the isocyanurate formation reaction is very high in the early stages, however, it is difficult to terminate the progression of the reaction in the early stages, and the reaction conditions, in particular, the amount of a catalyst added and method for adding a catalyst are needed to be carefully selected. For example, a method of adding a catalyst in portions at given intervals of time or the like is recommended as a suitable method. Accordingly, the conversion rate in the isocyanurate formation reaction to obtain the polyisocyanate of the present embodiment is preferably 30% or less, more preferably 25% or less, and even more preferably 20% or less. When the conversion rate is 30% or less, there is a tendency that a better adhesion to an upper-layer coating film and better compatibility with polyols can be attained, and the viscosity of the blocked polyisocyanate composition can be low.

For the catalyst for the iminooxadiazinedion reaction to form an iminooxadiazinedione group, for example, the catalysts of the following (1) and (2) known as iminooxadiazinedionation catalysts can be used in general.

(1) (Poly)hydrogen fluorides represented by the general formula $M[F_n]$ or the general formula $M[F_n(HF)_m]$ such as tetramethylammonium fluoride hydrate and tetraethylammonium fluoride, wherein m and n each represent an integer, with the proviso that m/n>0 is satisfied, and M represents a n-valent cation (mixture) or one or more radicals having a total valency of n.

(2) Compounds consisting of: a compound represented by the general formula $R^1$—$CR'_2$—C(O)O— or the general formula $R^2$=CR'—C(O)O— such as 3,3,3-trifluorocarboxylic acid; 4,4,4,3,3-pentafluorobutanoic acid; 5,5,5,4,4,3,3-heptafluoropentanoic acid; and 3,3-difluoroprop-2-enoic acid, wherein $R^1$ and $R^2$ each represent an optionally branched, cyclic, and/or unsaturated perfluoroalkyl group having 1 to 30 carbon atoms, and R's are the same or different and each selected from the group consisting of a hydrogen atom, an alkyl group having 1 to 20 carbon atoms, and an aryl group and optionally contain a hetero atom; and a quaternary ammonium cation or quaternary phosphonium cation.

The catalysts (1) are preferable from the viewpoint of availability, and the catalysts (2) are preferably from the viewpoint of safety.

The amount of each of these catalysts to be used is preferably 10 ppm by mass or more and 1000 ppm by mass or less based on the mass of a diisocyanate added. The lower limit is more preferably 20 ppm by mass, even more preferably 40 ppm by mass, and yet more preferably 80 ppm by mass. The upper limit is more preferably 800 ppm by mass, even more preferably 600 ppm by mass, and yet more preferably 500 ppm by mass or less. The reaction temperature is preferably 40 to 120° C. The lower limit of the reaction temperature is more preferably 50° C., and even more preferably 55° C. The upper limit of the reaction temperature is more preferably 100° C., even more preferably 90° C., and yet more preferably 80° C. When the reaction temperature is 40° C. or higher, there is a tendency that the reaction rate can be kept high. When the reaction temperature is 120° C. or lower, there is a tendency that coloration of a polyisocyanate can be suppressed.

Examples of a uretdione formation reaction catalyst to form a uretdione group include, but are not particularly limited to, tertiary phosphines, e.g., trialkylphosphines such as tri-n-butylphosphine and tri-n-octylphosphine; tris(dialkylamino)phosphines such as tris(dimethylamino)phosphine; and cycloalkylphosphines such as cyclohexyl-di-n-hexylphosphine. Many of the above uretdione formation reaction catalysts simultaneously promote an isocyanurate formation reaction, and generate an isocyanurate group-containing polyisocyanate in addition to a uretdione group-containing polyisocyanate. When a desired yield is reached, for example, a deactivation agent for the uretdione formation reaction catalyst such as phosphoric acid and methyl p-toluenesulfonate is added to terminate the uretdione formation reaction, though the deactivation agent is not particularly limited thereto. After the termination of the reaction, filtration is performed, if necessary.

Alternatively, a uretdione group can be obtained through heating of a diisocyanate monomer without using any of the above uretdione formation reaction catalysts. The heating temperature is preferably 120° C. or higher, more preferably 130° C. or higher and 170° C. or lower, and even more preferably 140° C. or higher and 160° C. or lower. The heating time is preferably 30 minutes or longer and 4 hours or shorter, more preferably 1.0 hour or longer and 3.0 hours or shorter, and even more preferably 1.0 hour or longer and 2.0 hours or shorter.

Next, an allophanate formation reaction to form an allophanate group will be described. It is preferable to use an allophanate formation reaction catalyst for forming an allophanate group. Specific examples of the catalyst include alkylcarboxylic acid salts of tin, lead, zinc, bismuth, zirconium, zirconyl, and the like; organotin compounds such as tin 2-ethylhexanoate and dibutyltin dilaurate; organolead compounds such as lead 2-ethylhexanoate; organozinc compounds such as zinc 2-ethylhexanoate; bismuth 2-ethylhexanoate, zirconium 2-ethylhexanoate, and zirconyl 2-ethylhexanoate. These can be used singly or in combinations of two or more.

Each of the above isocyanurate formation reaction catalysts can also serve as an allophanate formation reaction catalyst. When an allophanate formation reaction is performed using any of the above isocyanurate formation reaction catalysts, an isocyanurate group-containing polyisocyanate is naturally generated. Simultaneously performing an allophanate formation reaction and an isocyanurate reaction using any of the above isocyanurate formation reaction catalysts as an allophanate formation reaction catalyst is preferable in terms of economical production.

The alcohol which can be used for forming an allophanate group is not particularly limited, and is preferably an alcohol formed only of carbon, hydrogen, and oxygen, more preferably a monoalcohol, and even more preferably a monoalcohol having a molecular weight of 200 or less. Specific examples of the compound include monoalcohols such as methanol, ethanol, propanol, butanol, pentanol, hexanol, heptanol, octanol, and nonanol; and dialcohols such as ethylene glycol, 1,3-butanediol, neopentyl glycol, and 2-ethylhexanediol. These may be used singly or in combinations of two or more.

The above-described isocyanurate formation reaction, iminooxadiazinedione formation reaction, uretdione formation reaction, and allophanate formation reaction can be performed sequentially, or some of the reactions can be performed in parallel. Preferably, the isocyanurate formation reaction is performed first and the uretdione formation reaction is then performed. More preferably, the isocyanurate formation reaction is performed first and the uretdione formation reaction by heating is then performed, which can simplify the production process.

An unreacted diisocyanate monomer is removed from the reaction solution after the completion of the reactions by thin film evaporation, extraction, or the like, and thus the polyisocyanate of the present embodiment can be obtained.

For the purpose of suppressing coloration during storage, for example, an antioxidant or an ultraviolet absorber may be added to the polyisocyanate obtained. Examples of the antioxidant include hindered phenols such as 2,6-di-t-butyl-p-cresol. Examples of the ultraviolet absorber include benzotriazole and benzophenone. These may be used singly or in combinations of two or more. The amount of these added is preferably 10 ppm by mass or more and 500 ppm by mass or less.

[Blocked Polyisocyanate]

In the blocked polyisocyanate of the present embodiment, at least a part of isocyanate groups possessed by the polyisocyanate of the present embodiment is blocked with an active methylene-based compound containing a malonic acid diester.

The blocked polyisocyanate of the present embodiment is obtained by reacting at least a part of isocyanate groups possessed by the polyisocyanate with an active methylene-based compound containing a malonic acid diester as a blocking agent for blocking. It is only required that at least a part of the blocked polyisocyanate of the present embodiment is blocked with an active methylene-based compound containing a malonic acid diester, and the blocked polyisocyanate of the present embodiment may further have an isocyanate group blocked with a blocking agent other than malonic acid diesters in a manner without impairing the operation and effect of the present embodiment.

The active methylene-based compound of the present invention contains a malonic acid diester compound. The active methylene-based compound preferably further contains a β-ketoester compound or a β-amide ester in addition to the malonic acid diester compound, and more preferably further contains a β-ketoester compound. An active methylene-based compound other than malonic acid diesters, β-ketoester compounds, and β-amide ester compounds may be further contained in a manner without impairing the operation and effect of the present embodiment. Examples of the additional active methylene-based compound include, but are not particularly limited to, dinitrile malonate, acetylacetone, methylene disulfone, dibenzoylmethane, dipivalinemethane, and acetonedicarboxylic acid diester.

Examples of the malonic acid diester compound include, but are not particularly limited to, dimethyl malonate, diethyl malonate, di-n-propyl malonate, diisopropyl malonate, di-n-butyl malonate, diisobutyl malonate, di-t-butyl malonate, a malonic acid methyl t-butyl ester, di-n-hexyl malonate, di-2-ethylhexyl malonate, diphenyl malonate, and dibenzyl malonate. Among these, dimethyl malonate, diethyl malonate, di-n-propyl malonate, diisopropyl malonate, di-n-butyl malonate, diisobutyl malonate, di-t-butyl malonate, a malonic acid methyl t-butyl ester, di-n-hexyl malonate, and di-2-ethylhexyl malonate are preferable. More preferable are dimethyl malonate, diethyl malonate, di-n-propyl malonate, diisopropyl malonate, di-n-butyl malonate, diisobutyl malonate, di-t-butyl malonate, and a malonic acid methyl t-butyl ester, even more preferable are dimethyl malonate, diethyl malonate, di-n-propyl malonate, and diisopropyl malonate, and yet more preferable are diethyl malonate and diisopropyl malonate. The above malonic acid diester compounds can be used singly or in combinations of two or more.

Examples of the β-ketoester compound include, but are not particularly limited to, alkyl acetoacetates such as methyl acetoacetate, ethyl acetoacetate, isopropyl acetoacetate, n-propyl acetoacetate, t-butyl acetoacetate, and n-butyl acetoacetate; aryl acetoacetates such as phenyl acetoacetate; and isobutanoylacetates such as methyl isobutanoylacetate and ethyl isobutanoylacetate. Among these, acetoacetates are preferable from the viewpoint of storage stability, alkyl acetoacetates are more preferable, and, among these, methyl acetoacetate, ethyl acetoacetate, and isopropyl acetoacetate are even more preferable, and ethyl acetoacetate is yet more preferable from the viewpoint of storage stability and availability. The above β-ketoester compounds may be used singly or in combinations of two or more.

Examples of the β-amide ester compound include compounds shown in Japanese Patent No. 5562267, specifically, compounds formed through amidation of one ester of a malonic acid diester compound with an amine. The β-amide ester compounds may be used singly and in combinations of two or more.

Examples of the blocking agent other than active methylene-based compounds include, but are not particularly limited to, alcohol compounds, phenolic compounds, oxime compounds, amine compounds, acid amide compounds, imidazole compounds, pyridine compounds, and mercaptan compounds. The blocking agent other than active methylene-based compounds can be used for the isocyanate groups of the polyisocyanate in a manner without impairing the low-temperature curability.

<Monohydric Alcohol>

The blocked polyisocyanate composition of the present embodiment may further contain a monohydric alcohol to improve the crystallinity of the blocked polyisocyanate composition itself and the storage stability of a one-component coating composition using the blocked polyisocyanate composition.

Examples of the monohydric alcohol include, but are not particularly limited to, methanol, ethanol, n-propanol, isopropanol, n-butanol, isobutanol, 2-butanol, t-butanol, n-amyl alcohol, isoamyl alcohol, 2-methyl-1-butanol, n-hexanol, 2-methyl-1-pentanol, 2-ethyl-1-butanol, n-heptanol, n-octanol, 2-ethyl-1-hexanol, methyl cellosolve, ethyl cellosolve, butyl cellosolve, methyl carbitol, diethyl carbitol, propylene glycol monomethyl ether, cyclohexanol, phenol, benzyl alcohol, and isoamyl alcohol. The above monohydric alcohols may be used singly or in combinations of two or more.

The content of the monohydric alcohol is not particularly limited, and is preferably 10 eq % or more and 500 eq % or less, more preferably 20 eq % or more and 400 eq % or less, and even more preferably 30 eq % or more and 300 eq % or less of blocked isocyanate groups.

The blocked polyisocyanate composition of the present embodiment can further contain a phosphite compound. When a phosphite compound is contained, there is a tendency that the coloration of the blocked polyisocyanate composition itself over time can be more reliably suppressed. Examples of the phosphite compound include, but are not particularly limited to, phosphorous acid diester compounds and phosphorous acid triester compounds. The above phosphite compounds may be used singly or in combinations of two or more.

Examples of the phosphorous acid diester compound include, but are not particularly limited to, dialkyl phosphite compounds such as dilauryl hydrogen phosphite and dioleyl hydrogen phosphite; and diaryl phosphite compounds such as diphenyl hydrogen phosphite.

Examples of the phosphorous acid triester compound include, but are not particularly limited to, trialkyl phosphite compounds such as triethyl phosphite, tributyl phosphite, tris(2-ethylhexyl)phosphite, triisodecyl phosphite, tridecyl phosphite, tris(tridecyl)phosphite, tris(isotridecyl)phosphite, tristearyl phosphite, distearyl pentaerythritol diphosphite, trilauryl trithiophosphite, and bis(tridecyl)pentaerythritol diphosphite; triaryl phosphite compounds such as triphenyl phosphite, tris(nonylphenyl)phosphite, and tris(2,4-di-t-butylphenyl)phosphite; trialkylaryl phosphite compounds such as diphenylmono(2-ethylhexyl)phosphite, diphenylmonodecyl phosphite, diphenylmono(tridecyl)phosphite, tetraphenylpropylene glycol diphosphite, tetraphenyltetra(tridecyl)pentaerythritol tetraphosphite, tetra(tridecyl)-4,4'-isopropylidenediphenyl phosphite, and bis(nonylphenol)pentaerythritol diphosphite.

The content of the phosphite compound is not particularly limited, and is preferably 0.01 mass % or more and 10 mass % or less, more preferably 0.05 mass % or more and 5.0 mass % or less, and even more preferably 0.1 mass % or more and 2.0 mass % or less based on the mass (100 mass %) of the blocked polyisocyanate. When the content is 0.01 mass % or more, there is a tendency that the effect to suppress coloration over time is more reliably obtained. When the content is 10 mass % or less, there is a tendency that the curability can be more suitably maintained.

[Method for Producing Blocked Polyisocyanate Composition]

A method for producing the blocked polyisocyanate composition of the present embodiment has, for example, a reaction step (blocking reaction) of reacting the polyisocyanate of the present embodiment and an active methylene-based compound containing a malonic acid diester to obtain a blocked polyisocyanate; and a mixing step of mixing the resulting blocked polyisocyanate with various additives or the like to obtain a blocked polyisocyanate composition.

The blocking reaction can be performed irrespective of the presence or absence of a solvent. In the case of using a solvent, it is preferable to use a solvent that is inert to the isocyanate group. Examples of the inert solvent include butyl acetate and toluene.

In the blocking reaction, for example, an organic metal salt of tin, zinc, lead, or the like; a metal alcoholate such as sodium methylate, sodium ethylate, sodium phenolate, and potassium methylate; or a tertiary amine may be used as a catalyst, but the catalyst is not limited thereto.

The blocking reaction is preferably performed at −20° C. or higher and 150° C. or lower, and more preferably performed at 0° C. or higher and 100° C. or lower. When the blocking reaction is performed at 150° C. or lower, there is a tendency that side reactions are advantageously suppressed. When the blocking reaction is performed at −20° C. or higher, there is a tendency that the reaction rate can be adjusted within a suitable range, which is advantageous in productivity. The blocking reaction is preferably such that isocyanate groups are blocked so that active isocyanate groups are substantially lost.

In the case that the blocking reaction is performed with two or more blocking agents, two or more blocking reactions may be performed simultaneously, or first blocking with one blocking agent may be followed by subsequent blocking for the residual free isocyanate groups with another blocking agent.

At least a part of the catalyst used in the blocking reaction may be neutralized with an acidic compound or the like described below. Neutralization tends to improve the thermal stability of the blocked polyisocyanate composition, and thus is preferable.

Examples of the acidic compound include, but are not particularly limited to, inorganic acids such as hydrochloric acid, phosphorous acid, and phosphoric acid; sulfonic acids such as methanesulfonic acid and p-toluenesulfonic acid; and phosphates such as ethyl phosphate, diethyl phosphate, isopropyl phosphate, diisopropyl phosphate, butyl phosphate, dibutyl phosphate, 2-ethylhexyl phosphate, and di(2-ethylhexyl) phosphate. The amount of the acidic compound used is preferably 0.3 eq. or more and 3.0 eq. or less, more preferably 0.5 eq. or more and 2.0 eq. or less, and even more preferably 0.7 eq. or more and 1.5 eq. or less of the catalyst.

[One-Component Coating Composition]

The one-component coating composition according to the present embodiment contains the above-described blocked polyisocyanate composition and a polyvalent active hydrogen compound.

<Polyvalent Active Hydrogen Compound>

The polyvalent active hydrogen compound of the present embodiment is not particularly limited, and at least one selected from the group consisting of a polyol, a polyamine, and an alkanolamine is preferably contained. Among these, a polyol is more preferably contained.

Examples of the polyol include, but are not particularly limited to, polyester polyol, acrylic polyol, polyether polyol, polyolefin polyol, fluorine polyol, polycarbonate polyol, and polyurethane polyol. The above polyols may be used singly and in combinations of two or more.

Examples of the polyester polyol include, but are not particularly limited to, polyester polyols obtained by a condensation reaction of one or two or more dibasic acids selected from the group consisting of carboxylic acids such as succinic acid, adipic acid, sebacic acid, dimer acid, maleic anhydride, phthalic anhydride, isophthalic acid, and terephthalic acid with one or two or more polyhydric alcohols selected from the group consisting of ethylene glycol, propylene glycol, diethylene glycol, neopentyl glycol, trimethylolpropane, and glycerin; and polycaprolactones obtained by ring-opening polymerization of ε-caprolactone using a polyhydric alcohol.

Examples of the acrylic polyol include, but are not particularly limited to, acrylic polyols obtained by copolymerizing a single form or a mixture of an ethylenically unsaturated bond-containing monomer having a hydroxyl group with a single form or a mixture of another ethylenically unsaturated bond-containing monomer that is copolymerizable therewith.

Examples of the ethylenically unsaturated bond-containing monomer having a hydroxyl group include, but are not particularly limited to, hydroxyethyl acrylate, hydroxypropyl acrylate, hydroxybutyl acrylate, hydroxyethyl methacrylate, hydroxypropyl methacrylate, and hydroxybutyl methacrylate. Hydroxyethyl acrylate and hydroxyethyl methacrylate are preferable.

Examples of another ethylenically unsaturated bond-containing monomer that is copolymerizable with the above monomer include, but are not particularly limited to, acrylates such as methyl acrylate, ethyl acrylate, propyl acrylate, isopropyl acrylate, n-butyl acrylate, isobutyl acrylate, n-hexyl acrylate, cyclohexyl acrylate, 2-ethylhexyl acrylate, lauryl acrylate, benzyl acrylate, and phenyl acrylate; methacrylates such as methyl methacrylate, ethyl methacrylate, propyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate, and phenyl methacrylate; unsaturated carboxylic acids such as acrylic acid, methacrylic acid, maleic acid, and itaconic acid; unsaturated amides such as acrylamide, methacrylamide, N,N-methylenebisacrylamide, diacetoneacrylamide, diacetonemethacrylamide, maleic acid amide, and maleimide; vinyl monomers such as glycidyl methacrylate, styrene, vinyltoluene, vinyl acetate, acrylonitrile, and dibutyl fumarate; and vinyl monomers having a hydrolyzable silyl group such as vinyltrimethoxysilane, vinylmethyldimethoxysilane, and γ-(meth)acryloxypropyltrimethoxysilane.

Examples of the polyether polyol include, but are not particularly limited to, polyether polyols obtained by adding a single form or a mixture of alkylene oxide such as ethylene oxide, propylene oxide, butylene oxide, cyclohexene oxide, or styrene oxide to a single form or a mixture of a polyhydroxy compound using a strongly basic catalyst such as a hydroxide of lithium, sodium, potassium, or the like, an alcoholate, or an alkylamine; polyether polyols obtained by reacting a polyfunctional compound such as ethylenediamine with alkylene oxide; and so-called polymeric polyols obtained by polymerizing acrylamide or the like using the above polyethers as media.

Examples of the polyhydroxy compound include
(1) diglycerin, ditrimethylolpropane, pentaerythritol, dipentaerythritol, and the like,
(2) sugar alcohol compounds such as erythritol, D-threitol, L-arabinitol, ribitol, xylitol, sorbitol, mannitol, galactitol, and rhamnitol,
(3) monosaccharides such as arabinose, ribose, xylose, glucose, mannose, galactose, fructose, sorbose, rhamnose, fucose, and ribodesose,
(4) disaccharides such as trehalose, sucrose, maltose, cellobiose, gentiobiose, lactose, and melibiose,
(5) trisaccharides such as raffinose, gentianose, and melezitose, and
(6) tetrasaccharides such as stachyose.

Examples of the polyolefin polyol include, but are not particularly limited to, polybutadiene, hydrogenated polybutadiene, polyisoprene, and hydrogenated polyisoprene having two or more hydroxyl groups. The number of hydroxyl groups (hereinafter also referred to as "average number of hydroxyl groups") possessed by statistically one molecule of the polyol is preferably 2.0 or more. When the average number of hydroxyl groups of the polyol is 2.0 or more, there is a tendency that a decrease of the crosslink density of the resulting coating film can be suppressed.

The fluorine polyol is a polyol containing fluorine within the molecule, and examples include copolymers of fluoroolefin, cyclovinyl ether, hydroxyalkyl vinyl ether, monocarboxylic acid vinyl ester, and the like disclosed in Japanese Patent Laid-Open No. 57-34107 and Japanese Patent Laid-Open No. 61-275311.

Examples of the polycarbonate polyol include, but are not particularly limited to, those obtained by polycondensing low-molecular carbonate compounds such as dialkyl carbonates such as dimethyl carbonate, alkylene carbonates such as ethylene carbonate, and diaryl carbonates such as diphenyl carbonate with low-molecular polyols used in the polyester polyols described above.

The polyurethane polyol is not particularly limited, and can be obtained by, for example, reacting a polyol with a polyisocyanate according to an ordinary method. Examples of polyols containing no carboxyl group include ethylene glycol and propylene glycol as low-molecular weight polyols, and acrylic polyol, polyester polyol, and polyether polyol as high-molecular weight polyols.

The hydroxyl value per resin of the above polyol is not particularly limited, and is preferably 10 mg KOH/g of resin or more and 300 mg KOH/g of resin or less. When the hydroxyl value per resin is 10 mg KOH/g of resin or more, there is a tendency that a decrease of the crosslink density is suppressed, and the physical properties intended can be sufficiently achieved. On the other hand, when the hydroxyl value per resin is 300 mg KOH/g of resin or less, there is a tendency that an excessive increase of the crosslink density is suppressed, and the mechanical properties of the coating film can be maintained at a high level.

Among the polyols listed above, acrylic polyol and polyester polyol are preferable. In the coating composition when a polyol is used, the equivalent ratio between the blocked isocyanate groups and the hydroxyl groups of the polyol is preferably 10:1 to 1:10.

The polyamine is not particularly limited, and is preferably a polyamine having two or more primary amino groups or secondary amino groups within one molecule, and in particular, a polyamine having three or more within one molecule is more preferable.

Specific examples of the polyamine include, but are not particularly limited to, diamines such as ethylenediamine, propylenediamine, butylenediamine, triethylenediamine, hexamethylenediamine, 4,4'-diaminodicyclohexylmethane, piperazine, 2-methylpiperazine, and isophoronediamine; chain polyamines having three or more amino groups such as bishexamethylenetriamine, diethylenetriamine, triethylenetetramine, tetraethylenepentamine, pentamethylenehexamine, and tetrapropylenepentamine; and cyclic polyamines such as 1,4,7,10,13,16-hexaazacyclooctadecane, 1,4,7,10-tetraazacyclodecane, 1,4,8,12-tetraazacyclopentadecane, and 1,4,8,11-tetraazacyclotetradecane.

The alkanolamine is a compound having an amino group and a hydroxyl group within one molecule. Examples of the alkanolamine include, but are not particularly limited to, monoethanolamine, diethanolamine, aminoethylethanolamine, N-(2-hydroxypropyl)ethylenediamine, mono-, di- (n- or iso-) propanolamine, ethylene glycol-bis-propylamine, neopentanolamine, and methylethanolamine.

The one-component coating composition of the present embodiment may further contain an existing melamine resin, epoxy resin, or polyurethane resin, as necessary. When the above-described polyol has a carboxyl group, an oxazoline group-containing compound and a carbodiimide group-containing compound can be blended. When the above-described polyol has a carbonyl group, a hydrazide group-containing compound and a semicarbazide group-containing compound can be blended. Not only can one of these compounds be blended alone, but also two or more thereof can be blended in combination.

As necessary, the one-component coating composition of the present embodiment may further contain an antioxidant such as hindered phenol; an ultraviolet absorber such as benzotriazole or benzophenone; a pigment such as titanium oxide, carbon black, indigo, quinacridone, or pearl mica; a metallic flake pigment such as aluminum; a rheology controlling agent such as hydroxyethyl cellulose, a urea compound, or microgel; or a curing accelerator such as a tin compound, a zinc compound, or an amine compound.

The one-component coating composition prepared as described above is suitably used as a primer, an intermediate coat, or a top coat for substances, e.g., metals such as steel plates and surface-treated steel plates, plastics, and inorganic materials in roll coating, curtain flow coating, spray coating, electrostatic coating, bell coating, or the like. The coating material composition is suitably used to impart aesthetics, weather resistance, acid resistance, corrosion resistance, chipping resistance, adhesion, and the like to precoated metals including anticorrosive steel plates, automobile coatings, plastic coatings, and the like. The coating material composition is also useful as a urethane starting material for adhesives, pressure sensitive adhesives, elastomers, foams, surface treatment agents, and the like.

[Coating Film, Coated Article]

The coating film of the present embodiment is formed of the one-component coating composition described above. The coated article of the present embodiment also includes the coating film of the present embodiment. For example, the one-component coating composition of the present embodiment can be formed into a coating film via coating by roll coating, curtain flow coating, spray coating, electrostatic coating, bell coating, or the like and then a baking step, but the method for forming the coating film is not particularly limited thereto. The coating film preferably undergoes a baking step to form a crosslinked coating film. The crosslinked coating film after curing the one-component coating composition can have not only a urethane bond derived from a polyisocyanate before a blocking reaction but also a polar group such as an amide bond or an ester bond derived from a blocked isocyanate group. Accordingly, the crosslinked coating film formed from the one-component coating composition of the present embodiment tends to have excellent interlayer adhesion because interlayer hydrogen bonding and the like can be attained when performing layer-coating or recoating in addition to having chemical resistance, heat resistance, water resistance, and the like that are characteristics of commonly used urethane crosslinked coating films. Similar to the crosslinked coating film, a coating film in which a crosslinked structure is not completely formed after the baking step also has excellent adhesion when layer-coated or recoated because the coating film has the above polar group.

When several layers of coating liquids are applied one on top of the other on a wet-on-wet basis as in the coating in the assembly line of brand-new automobiles, the coating film may serve as a catalyst of a crosslinking reaction with a lower layer or an upper layer due to the presence of an organoamine compound in the one-component coating composition of the present embodiment or in the coating film after curing.

[Composite Coating Film, Method for Producing Composite Coating Film]

The composite coating film of the present embodiment includes a first coating film formed of the above-described one-component coating composition, and a second coating film on the first coating film. The composite coating film of the present embodiment has excellent adhesion between the first coating film and the second coating film as an upper-layer coating film.

The second coating film is not particularly limited, and can be a coating film containing, for example, acrylic melamine resin or acrylic urethane resin.

A method for producing the composite coating film of the present embodiment includes a step of coating with a first coating material solution containing the above-described one-component coating composition to form a first coating film; and a step of coating the first coating film with a second coating material solution to form a second coating film.

The first coating material solution can be, for example, a primer or an intermediate coat. The second coating material solution can be, for example, a top coat.

EXAMPLES

Below, the present embodiment will now be described in more detail by way of Examples, but the present embodiment is not limited to these Examples. Below, methods for measurements of various physical properties and methods of various evaluations will now be described. Unless otherwise specified, "part" and "%" indicate "part by mass" and "mass %", respectively.

(Physical Property 1) NCO Content (Mass %)

The NCO content (isocyanate content, mass %) of a polyisocyanate was measured as follows. First, 1 to 3 g (Wg) of a polyisocyanate produced in a Production Example was precisely weighed into an Erlenmeyer flask, 20 mL of toluene was added, and the polyisocyanate was completely dissolved. Thereafter, 10 mL of a solution of 2 N di-n-butylamine in toluene was added and completely mixed, and then the mixture was left to stand for 15 minutes at room temperature. Moreover, 70 mL of isopropyl alcohol was added to this solution and completely mixed. This solution was titrated with 1 N hydrochloric acid solution (factor F) using an indicator, and thus a titration value $V_2$ mL was obtained. The same titration operation was performed without polyisocyanate, and a titration value $V_1$ mL was obtained. The NCO content of the polyisocyanate was calculated from the resulting titration value $V_2$ mL and the titration value $V_1$ mL based on the following expression:

NCO content=$(V_1-V_2) \times F \times 42/(W \times 1000) \times 100$ (Physical Property 2) Viscosity (mPa·s)

The viscosity of a polyisocyanate was measured at 25° C. using an E-type viscometer (trade name: RE-85R, manufactured by Toki Sangyo Co., Ltd.). In this measurement, a standard rotor (1° 34'×R24) was used. The rotational speed was set as follows.

100 r.p.m. (when less than 128 mPa·s)

50 r.p.m. (when 128 mPa·s or more and less than 256 mPa·s)

20 r.p.m. (when 256 mPa·s or more and less than 640 mPa·s)

10 r.p.m. (when 640 mPa·s or more and less than 1280 mPa·s)

5 r.p.m. (when 1280 mPa·s or more and less than 2560 mPa·s)

2.5 r.p.m. (when 2560 mPa·s or more and less than 5120 mPa·s)

1.0 r.p.m. (when 5120 mPa·s or more and less than 10240 mPa·s)

0.5 r.p.m. (when 10240 mPa·s or more and less than 20480 mPa·s)

(Physical Property 3) Number Average Molecular Weight

The number average molecular weight of a polyisocyanate was determined as a number average molecular weight in terms of polystyrene by gel permeation chromatography (hereinafter abbreviated as "GPC") using the following apparatus.

Apparatus: "HLC-8120GPC" (trade name) manufactured by Tosoh Corporation

Columns: "TSKgel SuperH1000" (trade name)×1

"TSKgel SuperH2000" (trade name)×1

"TSKgel SuperH3000" (trade name)×1 manufactured by Tosoh Corporation

Carrier: Tetrahydrofuran

Detection method: Differential refractometry (Physical Property 4) Content of Component Having Number Average Molecular Weight of 1500 or Less in Blocked Polyisocyanate Composition The content of a component having a number average molecular weight of 1500 or less in a blocked polyisocyanate composition was calculated through measurement for a blocked polyisocyanate composition by using the apparatus, columns, and calibration curve used in (Physical Property 3) Number average molecular weight.

(Physical Property 5) Average Number of Isocyanate Groups

The average number of isocyanate groups of a polyisocyanate was calculated from the NCO content of (Physical Property 1) and the number average molecular weight of (Physical Property 3) based on the following expression:

Average number of isocyanate groups=Number average molecular weight×NCO content/100/42

The average number of isocyanate groups of a blocked polyisocyanate composition was calculated from the effective NCO content of (Physical Property 7) and the number average molecular weight of a blocked polyisocyanate measured in (Physical Property 4) based on the following expression:

Average number of isocyanate groups=Number average molecular weight×Effective NCO content/100/42

(Physical Property 6) Diisocyanate Monomer Concentration by Mass (Mass %)

The diisocyanate concentration by mass of a polyisocyanate was determined as follows. Initially, a 20 mL sample bottle was placed on a digital scale, and about 1 g of a sample was precisely weighed. Next, 0.03 to 0.04 g of nitrobenzene (an internal standard solution) was added, and the weight was precisely measured. Finally, about 9 mL of ethyl acetate was added, and then the lid was tightly placed, followed by thorough mixing to prepare a sample. The prepared sample was analyzed and quantified by gas chromatography under the following conditions.

Apparatus: "GC-8A" manufactured by Shimadzu Corporation

Column: "Silicone OV-17" manufactured by Shinwa Chemical Industries Ltd.

Column oven temperature: 120° C.

Injection/detector temperature: 160° C.

(Physical Property 7) Effective NCO Content (Mass %)

The effective NCO content of a blocked polyisocyanate composition was determined as follows. Here, the effective NCO content (mass %) is for quantifying the amount of blocked isocyanate groups that are possibly involved in a crosslinking reaction and that are present in a blocked polyisocyanate composition after a blocking reaction, and is expressed as the mass % of isocyanate groups and calculated based on the following expression:

{(Solids content (mass %) of blocked polyisocyanate composition)×(Mass of polyisocyanate used in reaction×NCO content of polyisocyanate (mass %))}/(Resin mass of blocked polyisocyanate composition after blocking reaction)

When a sample was diluted with a solvent or the like, the value obtained in a diluted state was indicated.

(Physical Property 8) Solids Concentration (Mass %)

An aluminum plate having a bottom diameter of 38 mm was precisely weighed, then about 1 g of a blocked polyisocyanate composition of an Example or a Comparative Example was placed on the aluminum plate, and the weight was precisely measured (W1). The blocked polyisocyanate composition was adjusted to have a uniform thickness and retained in an oven at 105° C. for 1 hour. After the aluminum plate reached room temperature, the blocked polyisocyanate composition remaining on the aluminum plate was precisely weighed (W2).

Solids concentration=$W2/W1\times100$ (Physical Property 9) Molar Ratios

The molar ratios of iminooxadiazinedione groups, uretdione groups, allophanate groups, and isocyanurate groups were determined by $^{13}$C-NMR measurement using "Biospin Avance 600" (trade name) manufactured by Bruker Corporation. Specific measurement conditions were as follows.

$^{13}$C-NMR apparatus: AVANCE 600 (manufactured by Bruker Corporation)

Cryo Probe (manufactured by Bruker Corporation)

CPDUL

600S3-C/H-D-05Z

Resonance frequency: 150 MHz

Concentration: 60 wt/vol %

Shift reference: $CDCl_3$ (77 ppm)

Number of scans: 10000 times

Pulse program: zgpg30 (proton complete decoupling method, delay: 2 sec)

The integral values of the following signals were divided by the number of carbon atoms measured, and each molar ratio was calculated from the resulting values.

Molar amount of iminooxadiazinedione groups (mol %, represented by "B"): in the vicinity of 144.6 ppm, integral value/1

Molar amount of isocyanurate groups (mol %, represented by "A"): in the vicinity of 148.6 ppm, integral value/3

Molar amount of uretdione groups (mol %, represented by "C"): in the vicinity of 157.5 ppm, integral value/2

Molar amount of allophanate groups (mol %, represented by "D"): in the vicinity of 154 ppm, integral value/1

The molar ratios determined were the following four values, each determined by using a polyisocyanate and a blocked polyisocyanate composition as a sample.

Molar ratio: (B+C+D)/(A+B+C+D)
Molar ratio: B/(A+B+C+D)
Molar ratio: C/(A+B+C+D)
Molar ratio: D/(A+B+C+D)

(Evaluation 1) Low-Temperature Curability

"Setalux 1152" (acrylic polyol, a name of a commercial product manufactured by Nuplex Resins, a hydroxyl value of 138 mg KOH/g of resin, a solids concentration of 51 mass %) and a blocked polyisocyanate composition were blended so as to have NCO/OH=1.0, and adjusted to 20 seconds/23° C. with butyl acetate using a Ford cup No. 4, and thus an α coating material solution was obtained. A PP plate was coated with the resulting α coating material solution with an air spray gun so as to have a dry film thickness of 40 μm, dried at a temperature of 23° C. for 30 minutes, and then baked at 90° C. for 20 minutes, and thus a cured coating film was obtained. After being baked, the resulting cured coating film was left to stand at 20° C. for 1 hour, peeled from the PP plate, and immersed in acetone at 20° C. for 24 hours. The value (gel fraction) of the mass of the undissolved portion relative to the mass before immersion was calculated, and the low-temperature curability was evaluated according to the following criteria.

⊚: Gel fraction of 90% or more
○: Gel fraction of 80% or more and less than 90%
Δ: Gel fraction of 70% or more and less than 80%
X: Gel fraction of less than 70%

(Evaluation 2) Adhesion to Upper-Layer Coating Film

A mild steel plate was coated with the α coating material solution obtained in (Evaluation 1) with an air spray gun so as to have a dry film thickness of 40 μm, dried at a temperature of 23° C. for 30 minutes, and then baked at 90° C. for 20 minutes, and thus an α coating film layer 1 was obtained. The adhesion of the α coating film layer 1 to the mild steel plate was examined in accordance with JIS K5600-5-6. As a result, peeling, including partial bulging or the like, was not observed.

Then, 70 parts by mass of "Setalux 1767" (acrylic polyol, a name of a commercial product manufactured by Nuplex Resins, a hydroxyl value of 150 mg KOH/g of resin, a solids concentration of 65 mass %), 30 parts by mass of hexamethoxymethylated melamine resin "Cymel® 300" manufactured by Nihon Cytec Industries Inc., and 1 part by mass of p-toluenesulfonic acid were mixed, and adjusted to 20 seconds/23° C. with butyl acetate using a Ford cup No. 4, and thus a β coating material solution was obtained.

Separately, a mild steel plate was coated with the α coating material solution obtained in (Evaluation 1) with an air spray gun so as to have a dry film thickness of 40 μm, dried at a temperature of 23° C. for 30 minutes, and then baked at 90° C. for 20 minutes, and thus an α coating film layer 2 was obtained. The α coating film layer 2 was coated with the β coating material solution so as to have a dry film thickness of 40 μm, dried at a temperature of 23° C. for 30 minutes, and then baked at 140° C. for 30 minutes, and thus a multilayer coating film having an α layer and a β layer was obtained. The adhesion of the resulting multilayer coating film was examined in accordance with JIS K5600-5-6. The adhesion to an upper-layer coating film was evaluated according to the following criteria.

⊚: Coating film neither peeled nor bulged
○: Cut part partially bulged
Δ: Less than half the coating film peeled
X: Not less than half the coating film peeled (Evaluation 3) Compatibility with Polyols A glass plate was coated with the α coating material solution obtained in (Evaluation 1) with an air spray gun so as to have a dry film thickness of 80 μm, dried at a temperature of 23° C. for 30 minutes, baked at 90° C. for 20 minutes, and then cooled. The plate was visually examined, and the compatibility with polyols was evaluated according to the following criteria.

○: Transparent
Δ: Slightly turbid
X: Highly turbid (Evaluation 4) Hardness of Coating Film "Setalux 1903" (acrylic polyol, manufactured by Nuplex Resins, a hydroxyl value of 4.5 mass %/g of resin, a solids content of 75 mass %) and a blocked polyisocyanate composition were blended so as to have NCO/OH=1.0, and adjusted to 20 seconds/23° C. with butyl acetate using a Ford cup No. 4, and thus a β coating material solution was obtained. A glass plate was coated with the resulting β coating material solution with an air spray gun so as to have a dry film thickness of 40 μm, dried at a temperature of 23° C. for 30 minutes, and then baked at 140° C. for 20 minutes, and thus a cured coating film was obtained. The hardness of the coating film obtained was measured by using the following apparatus, and evaluations were made according to the following criteria.

Apparatus used: micro-hardness tester FM-700 (manufactured by FUTURE-TECH CORP.)
Indenter: rhombus diamond indenter for Knoop hardness
○: Knoop hardness of 10 or higher
Δ: Knoop hardness of 9 or higher and lower than 10
X: Knoop hardness of lower than 9

Production Example 1

A four-neck flask equipped with a stirrer, a thermometer, a reflux condenser tube, a nitrogen inlet tube, and a dropping funnel was nitrogen-purged and charged with 100 parts by mass of HDI, and the temperature inside the reactor was retained at 60° C. while stirring, and 0.22 parts of 5% n-butanol solution of tetramethylammonium fluoride tetrahydrate was added as a catalyst component. Thereafter, the temperature inside the reactor was retained at 70° C. or lower, and when the NCO content of the reaction solution reached 39.1 mass %, 0.066 parts of dibutyl phosphate was added to terminate the reaction. The reaction solution was filtered, then unreacted HDI was removed using a thin film evaporator, and thus polyisocyanate P-1 was obtained that had an NCO content of 22.8 mass %, a viscosity at 25° C. of 2100 mPa·s, a number average molecular weight of 610, an average number of isocyanate groups of 3.3, and an HDI monomer concentration by mass of 0.3 mass %. The molar ratios determined from $^{13}$C-NMR measurement for the polyisocyanate obtained are shown in Table 1.

Production Example 2

A four-neck flask equipped with a stirrer, a thermometer, a reflux condenser tube, a nitrogen inlet tube, and a dropping funnel was nitrogen-purged and charged with 100 parts by mass of HDI, and the temperature inside the reactor was retained at 60° C. while stirring, 0.05 parts of 70% isopropanol solution of tetrabutylphosphonium hydrogen difluoride was added as a catalyst component. Thereafter, the temperature inside the reactor was retained at 70° C. or lower, and when the NCO content of the reaction solution reached 43.3 mass %, 0.0575 parts of 40% isopropanol solution of p-toluenesulfonic acid was added to terminate the reaction. The reaction solution was filtered, then unreacted HDI was removed using a thin film evaporator, and thus polyisocyanate P-2 was obtained that had an NCO content of 23.4 mass %, a viscosity at 25° C. of 640 mPa·s, a number average molecular weight of 570, an average number of isocyanate groups of 3.2, and an HDI monomer concentration by mass of 0.3 mass %. The molar ratios determined from $^{13}$C-NMR measurement for the polyisocyanate obtained are shown in Table 1.

Production Example 3

A four-neck flask equipped with a stirrer, a thermometer, a reflux condenser tube, a nitrogen inlet tube, and a dropping funnel was nitrogen-purged and charged with 100 parts by mass of HDI, and the temperature inside the reactor was retained at 60° C. while stirring, 0.0948 parts of 58% 1-methoxy-2-propanol solution of tetrabutylphosphonium pyridinotriazolate was added as a catalyst component. Thereafter, the temperature inside the reactor was retained at 65° C. or lower, and when the NCO content of the reaction solution reached 42.2 mass %, 0.033 parts of dibutyl phosphate was added to terminate the reaction. The reaction solution was filtered, then unreacted HDI was removed using a thin film evaporator, and thus polyisocyanate P-3 was obtained that had an NCO content of 21.4 mass %, a viscosity at 25° C. of 340 mPa·s, a number average molecular weight of 490, an average number of isocyanate groups of 2.5, and an HDI monomer concentration by mass of 0.3 mass %. The molar ratios determined from $^{13}$C-NMR measurement for the polyisocyanate obtained are shown in Table 1.

Production Example 4

A four-neck flask equipped with a stirrer, a thermometer, a reflux condenser tube, a nitrogen inlet tube, and a dropping funnel was nitrogen-purged and charged with 100 parts by mass of HDI, and the temperature inside the reactor was retained at 60° C. while stirring, 0.15 parts of 10% 2-ethyl-1-hexanol solution of tetrabutylammonium acetate was added as a catalyst component, and when the NCO content of the reaction solution reached 43.8 mass %, 0.0235 parts of 85% aqueous solution of phosphoric acid was added to terminate the reaction. The reaction solution was filtered, then unreacted HDI was removed using a thin film evaporator, and thus polyisocyanate P-4 was obtained that had an NCO content of 23.0 mass %, a viscosity at 25° C. of 1200 mPa·s, a number average molecular weight of 580, an average number of isocyanate groups of 3.2, and an HDI monomer concentration by mass of 0.2 mass %. The molar ratios determined from $^{13}$C-NMR measurement for the polyisocyanate obtained are shown in Table 1.

Production Example 5

Reactions were performed in the same manner as in Production Example 4 except that 2.5 parts of 0.2% 2-ethyl-1-hexanol solution of tetrabutylammonium acetate was added as a catalyst component, and when the NCO content of the reaction solution reached 41.8 mass %, 0.0079 parts of 85% aqueous solution of phosphoric acid was added to terminate the reaction. The reaction solution was filtered, then unreacted HDI was removed using a thin film evaporator, and thus polyisocyanate P-5 was obtained that had an NCO content of 20.8 mass %, a viscosity at 25° C. of 470 mPa·s, a number average molecular weight of 560, an average number of isocyanate groups of 2.8, and an HDI monomer concentration by mass of 0.2 mass %. The molar ratios determined from $^{13}$C-NMR measurement for the polyisocyanate obtained are shown in Table 1.

Production Example 6

Reactions were performed in the same manner as in Production Example 4 except that when the NCO content of the reaction solution reached 38.9 mass %, 0.0235 parts of 85% aqueous solution of phosphoric acid was added to terminate the reaction. The reaction solution was filtered, then unreacted HDI was removed using a thin film evaporator, and thus polyisocyanate P-6 was obtained that had an NCO content of 22.3 mass %, a viscosity at 25° C. of 2700 mPa·s, a number average molecular weight of 640, an average number of isocyanate groups of 3.4, and an HDI monomer concentration by mass of 0.3 mass %. The molar ratios determined from $^{13}$C-NMR measurement for the polyisocyanate obtained are shown in Table 1.

Production Example 7

A four-neck flask equipped with a stirrer, a thermometer, a reflux condenser tube, a nitrogen inlet tube, and a dropping funnel was nitrogen-purged and charged with 1000 parts by mass of HDI, 0.9 parts by mass of isobutanol, and 30 parts by mass of 2-ethyl-1-hexanol, and the temperature inside the reactor was retained at 80° C. for 1 hour while stirring. Thereafter, 0.05 parts by mass of tetramethylammonium capriate as an isocyanurate formation reaction catalyst was added to perform an isocyanurate formation reaction and an allophanate formation reaction, and when the refractive index change of the reaction solution reached 0.0085, 0.09 parts by mass of 85% aqueous solution of phosphoric acid was added to terminate the reaction. Thereafter, the reaction solution was warmed to 90° C., and the temperature was retained at 90° C. for 1 hour to completely deactivate the catalyst. The reaction solution cooled was filtered, then unreacted HDI was removed using a thin film evaporator, and thus polyisocyanate P-7 was obtained that had an NCO content of 20.4 mass %, a viscosity at 25° C. of 340 mPa·s, a number average molecular weight of 540, an average number of isocyanate groups of 2.6, and an unreacted HDI concentration by mass of 0.1 mass %. The molar ratios determined from $^{13}$C-NMR measurement for the polyisocyanate obtained are shown in Table 1.

Production Example 8

Reactions were performed in the same manner as in Production Example 7 except that 100 parts by mass of 2-ethyl-1-hexanol was added and the refractive index change of the reaction solution was set to 0.014. Thus, polyisocyanate P-8 was obtained that had an NCO content of 17.6 mass %, a viscosity at 25° C. of 420 mPa·s, a number average molecular weight of 550, an average number of isocyanate groups of 2.3, and an unreacted HDI concentration by mass of 0.1 mass %. The molar ratios determined from $^{13}$C-NMR measurement for the polyisocyanate obtained are shown in Table 1.

Production Example 9

A four-neck flask equipped with a stirrer, a thermometer, a reflux condenser tube, a nitrogen inlet tube, and a dropping funnel was nitrogen-purged and charged with 100 parts by mass of HDI, and the temperature inside the reactor was retained at 60° C. while stirring. Thereto, 1.5 parts by mass of tri-n-butylphosphine (Cytop™ 340, Cytec) as a uretdione formation reaction catalyst was added to perform a uretdione formation reaction and an isocyanurate formation reaction, and when the conversion rate in measurement of the refractive index of the reaction solution reached 40%, 1.33 parts by mass of methyl p-toluenesulfonate was added to terminate the reaction. The reaction solution cooled was filtered, then unreacted HDI was removed using a thin film evaporator, and thus polyisocyanate P-9 was obtained that had an NCO content of 22.1 mass %, a viscosity at 25° C. of 150 mPa·s, a number average molecular weight of 440, an average number of isocyanate groups of 2.3, and an unreacted HDI concentration by mass of 0.3 mass %. The molar ratios determined from $^{13}$C-NMR measurement for the polyisocyanate obtained are shown in Table 1.

TABLE 1

| | | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|---|
| Polyisocyanate | | P-1 | P-2 | P-3 | P-4 | P-5 | P-6 | P-7 | P-8 | P-9 |
| (Physical Property 1) NCO content | mass % | 22.8 | 23.4 | 21.4 | 23.0 | 20.8 | 22.3 | 20.4 | 17.6 | 22.1 |
| (Physical Property 2) Viscosity | mPas/25° C. | 2100 | 640 | 340 | 1200 | 470 | 2700 | 340 | 420 | 150 |
| (Physical Property 3) Number average molecular weight | | 610 | 570 | 490 | 580 | 560 | 640 | 540 | 550 | 440 |
| (Physical Property 5) Average number of isocyanate groups | | 3.3 | 3.2 | 2.5 | 3.2 | 2.8 | 3.4 | 2.6 | 2.3 | 2.3 |
| (Physical Property 6) Diisocyanate monomer concentration by mass | mass % | 0.3 | 0.3 | 0.3 | 0.2 | 0.2 | 0.3 | 0.1 | 0.1 | 0.3 |
| (Physical Property 9) A: isocyanurate groups | mol % | 74 | 43 | 25 | 98 | 70 | 98 | 45 | 35 | 16 |
| (Physical Property 9) B: iminooxadiazinedione groups | mol % | 18 | 51 | 22 | 1.0 | 1.0 | 1.0 | — | — | 7.0 |
| (Physical Property 9) C: uretdione groups | mol % | 3.0 | 5.5 | 52 | — | — | — | 1.0 | 1.0 | 76 |
| (Physical Property 9) D: allophanate groups | mol % | 5.0 | 0.5 | 1.0 | 1.0 | 29 | 1.0 | 54 | 64 | 1.0 |

Example 1

A four-neck flask equipped with a stirrer, a thermometer, a reflux condenser tube, and a nitrogen inlet tube was nitrogen-purged and charged with 100 parts of polyisocyanate P-1, 82.2 parts of diethyl malonate, 7.4 parts of ethyl acetoacetate, and 40 parts of n-butyl acetate. Then, 0.8 parts of a 28% sodium methylate solution was added, and a reaction was carried out at 60° C. for 6 hours. Then, 79 parts of n-butanol was added, and stirring was continued at that temperature for 2 hours. Thereafter, 0.8 parts of mono(2-ethylhexyl) phosphate was added thereto, and thus a blocked polyisocyanate composition was obtained that had a resin content of 60 mass % and an effective NCO % of 7.4%. The results of physical properties obtained are shown in Table 2. Separately, the blocked polyisocyanate composition obtained was transferred to an eggplant flask, and subjected to vacuum distillation with an evaporator under reduced pressure of 10 hPa at 60° C. for 60 minutes to remove most of the solvent, and then $^{13}$C-NMR measurement was performed. The results of molar ratios obtained are shown in Table 2. Subsequently, the low-temperature curability, adhesion to an upper-layer coating film, compatibility with polyols, and hardness of the coating film were evaluated. The results obtained are shown in Table 2.

Example 6

A four-neck flask equipped with a stirrer, a thermometer, a reflux condenser tube, and a nitrogen inlet tube was nitrogen-purged and charged with 100 parts of polyisocyanate P-1, 91.3 parts of diethyl malonate, and 80.0 parts of n-butyl acetate. Then, 0.8 parts of a 28% sodium methylate solution was added, and a reaction was carried out at 60° C. for 6 hours. The infrared spectrum was measured to confirm the disappearance of isocyanate groups, and 0.8 parts of mono(2-ethylhexyl) phosphate was added.

Subsequently, 54.9 parts of diisopropylamine was added, and the reaction solution was retained at a temperature of 70° C. for 5 hours. This reaction solution was analyzed by gas chromatography to confirm that the reaction rate of diisopropylamine was 70%. Thereafter, 19.0 parts of n-butanol was added, and thus a blocked polyisocyanate composition was obtained that had a resin content of 60 mass % and an effective NCO % of 6.6%. The results of physical properties obtained are shown in Table 2. Separately, the blocked polyisocyanate composition obtained was transferred to an eggplant flask, and subjected to vacuum distillation with an evaporator under reduced pressure of 10 hPa at 60° C. for 60 minutes to remove most of the solvent, and then $^{13}$C-NMR measurement was performed. The results of molar ratios obtained are shown in Table 2. Subsequently, the low-temperature curability, adhesion to an upper-layer coating film, compatibility with polyols, and hardness of the coating film were evaluated. The results obtained are shown in Table 2.

Examples 2 to 5, 7 to 9, Comparative Examples 1 to 5

Blocked polyisocyanate compositions were obtained in the same manner as in Example 1 except that the formulations shown in Table 2 were used. The physical properties and evaluation results of the resulting blocked polyisocyanate compositions are shown in Table 2 and Table 3.

TABLE 2

| | | | Example 1 | Example 2 | Example 3 | Example 4 | Example 5 | Example 6 | Example 7 | Example 8 | Example 9 |
|---|---|---|---|---|---|---|---|---|---|---|---|
| Polyisocyanate | Kind | | P-1 | P-1 | P-3 | P-3 | P-1 | P-1 | P-5 | P-2 | P-7 |
| | Parts by mass | | 100 | 30 | 50 | 60 | 100 | 100 | 100 | 100 | 100 |
| | Kind | | — | P-4 | P-4 | P-4 | — | — | — | — | — |
| | Parts by mass | | — | 70 | 50 | 40 | — | — | — | — | — |
| Blocking agent | Malonic acid diester compound | Kind | Diethyl malonate | Diethyl malonate | Diethyl malonate | Diethyl malonate | Diisopropyl malonate | Diethyl malonate | Diethyl malonate | Diethyl malonate | Diethyl malonate |
| | | Parts by mass | 82.2 | 82.5 | 80 | 79.3 | 103.5 | 91.3 | 75 | 84.3 | 73.2 |
| | Another blocking agent | Kind | Ethyl acetoacetate | Ethyl acetoacetate | Ethyl acetoacetate | Ethyl acetoacetate | — | Diisopropylamine | Ethyl acetoacetate | Ethyl acetoacetate | Ethyl acetoacetate |
| | | Parts by mass | 7.4 | 7.5 | 7.2 | 7.2 | — | 54.9 | 6.8 | 7.6 | 6.6 |
| Solvent | n-Butyl acetate | Parts by mass | 40 | 40 | 40 | 40 | 40 | 80 | 40 | 40 | 40 |
| Alcohol | Kind | | n-Butanol | n-Butanol | n-Butanol | n-Butanol | n-Butanol | n-Butanol | n-Butanol | n-Butanol | n-Butanol |
| | Mass (g) | | 79 | 79 | 77 | 77 | 86 | 19 | 74 | 80 | 68 |
| Blocking agent/NCO groups | | Molar ratio | 1.05 | 1.05 | 1.05 | 1.05 | 1.05 | 1.05 | 1.05 | 1.05 | 1.05 |
| 28% NaOMe methanol solution | | Parts by mass | 0.8 | 0.8 | 0.8 | 0.8 | 0.8 | 0.8 | 0.8 | 0.8 | 0.8 |
| 2-Ethylhexyl phosphate | | Parts by mass | 0.8 | 0.8 | 0.8 | 0.8 | 0.8 | 0.8 | 0.8 | 0.8 | 0.8 |
| (Physical Property 9) A: isocyanurate groups | | mol % | 74 | 91 | 62 | 54 | 74 | 74 | 70 | 43 | 45 |

TABLE 2-continued

|  |  | Example 1 | Example 2 | Example 3 | Example 4 | Example 5 | Example 6 | Example 7 | Example 8 | Example 9 |
|---|---|---|---|---|---|---|---|---|---|---|
| (Physical Property 9) B: iminooxadiazinedione groups | mol % | 18 | 6.1 | 12 | 14 | 18 | 18 | 1.0 | 51 | 0 |
| (Physical Property 9) C: uretdione groups | mol % | 3.0 | 0.9 | 26 | 31 | 3 | 3.0 | 0 | 5.5 | 1.0 |
| (Physical Property 9) D: allophanate groups | mol % | 5.0 | 2.2 | 1.0 | 1.0 | 5.0 | 5.0 | 29 | 0.5 | 54 |
| (Physical Property 9) (B + C + D)/(A + B + C + D) | Molar ratio | 0.26 | 0.09 | 0.39 | 0.46 | 0.26 | 0.26 | 0.30 | 0.57 | 0.55 |
| (Physical Property 9) B/(A + B + C + D) | Molar ratio | 0.18 | 0.06 | 0.12 | 0.14 | 0.18 | 0.18 | 0.01 | 0.51 | 0 |
| (Physical Property 9) C/(A + B + C + D) | Molar ratio | 0.03 | 0.01 | 0.26 | 0.31 | 0.03 | 0.03 | 0 | 0.06 | 0.01 |
| (Physical Property 9) D/(A + B + C + D) | Molar ratio | 0.05 | 0.02 | 0.01 | 0.01 | 0.05 | 0.05 | 0.29 | 0.01 | 0.54 |
| (Physical Property 4) Fraction of component having number average molecular weight of 1500 or less | mass % | 58 | 62 | 61 | 61 | 57 | 56 | 59 | 59 | 64 |
| (Physical Property 5) Average number of isocyanate groups |  | 3.3 | 3.2 | 2.8 | 2.8 | 3.3 | 3.3 | 2.8 | 3.2 | 2.6 |
| (Physical Property 7) Effective NCO content | mass % | 7.4 | 7.4 | 7.3 | 7.2 | 6.6 | 6.6 | 7.0 | 7.5 | 6.8 |
| (Physical Property 8) Solids concentration | mass % | 60 | 60 | 60 | 60 | 60 | 60 | 60 | 60 | 60 |
| (Evaluation 1) Low-temperature curability |  | ◎ | ◎ | Δ | Δ | ◎ | ◎ | ○ | ◎ | Δ |
| (Evaluation 2) Adhesion to upper-layer coating film |  | ◎ | Δ | ◎ | ◎ | ○ | ○ | ○ | ◎ | ◎ |
| (Evaluation 3) Compatibility with polyols |  | ○ | Δ | ○ | ○ | ○ | ○ | ○ | ○ | ○ |
| (Evaluation 4) Hardness of coating film |  | ○ | ○ | Δ | Δ | ○ | ○ | Δ | X | X |

TABLE 3

|  |  |  | Comparative Example 1 | Comparative Example 2 | Comparative Example 3 | Comparative Example 4 | Comparative Example 5 |
|---|---|---|---|---|---|---|---|
| Polyisocyanate | Kind |  | P-3 | P-4 | P-6 | P-8 | P-9 |
|  | Parts by mass |  | 100 | 100 | 100 | 100 | 100 |
|  | Kind |  | — | — | — | — | — |
|  | Parts by mass |  | — | — | — | — | — |
| Blocking agent | Malonic acid diester compound | Kind | Diethyl malonate | Diethyl malonate | Diethyl malonate | Diethyl malonate | Diethyl malonate |
|  |  | Parts by mass | 77.2 | 82.9 | 80.4 | 63.6 | 79.6 |
|  | Another blocking agent | Kind | Ethyl acetoacetate | Ethyl acetoacetate | Ethyl acetoacetate | Ethyl acetoacetate | Ethyl acetoacetate |
|  |  | Parts by mass | 7.0 | 7.5 | 7.3 | 5.7 | 7.2 |
| Solvent | n-Butyl acetate | Parts by mass | 40 | 40 | 40 | 40 | 40 |
| Alcohol | Kind |  | n-Butanol | n-Butanol | n-Butanol | n-Butanol | n-Butanol |
|  | Mass (g) |  | 75 | 79 | 77 | 68 | 75 |
| Blocking agent/NCO groups | Molar ratio |  | 1.05 | 1.05 | 1.05 | 1.05 | 1.05 |
| 28% NaOMe methanol solution | Parts by mass |  | 0.8 | 0.8 | 0.8 | 0.8 | 0.8 |
| 2-Ethylhexyl phosphate | Parts by mass |  | 0.8 | 0.8 | 0.8 | 0.8 | 0.8 |
| (Physical Property 9) A: isocyanurate groups | mol % |  | 25 | 98 | 98 | 35 | 16 |
| (Physical Property 9) B: iminooxadiazinedione groups | mol % |  | 22 | 1.0 | 1.0 | 0 | 7.0 |
| (Physical Property 9) C: uretdione groups | mol % |  | 52 | 0 | 0 | 1.0 | 76 |
| (Physical Property 9) D: allophanate groups | mol % |  | 1.0 | 1.0 | 1.0 | 64 | 1.0 |
| (Physical Property 9) (B + C + D)/(A + B + C + D) | Molar ratio |  | 0.75 | 0.02 | 0.02 | 0.65 | 0.84 |
| (Physical Property 9) B/(A + B + C + D) | Molar ratio |  | 0.22 | 0.01 | 0.01 | 0 | 0.07 |
| (Physical Property 9) C/(A + B + C + D) | Molar ratio |  | 0.52 | 0 | 0 | 0.01 | 0.76 |
| (Physical Property 9) D/(A + B + C + D) | Molar ratio |  | 0.01 | 0.01 | 0.01 | 0.64 | 0.01 |
| (Physical Property 4) Fraction of component having number average molecular weight of 1500 or less | mass % |  | 67 | 60 | 60 | 63 | 75 |
| (Physical Property 5) Average number of isocyanate groups |  |  | 2.5 | 3.2 | 3.2 | 2.3 | 2.3 |
| (Physical Property 7) Effective NCO content | mass % |  | 7.1 | 7.4 | 7.3 | 6.2 | 7.1 |
| (Physical Property 8) Solids concentration | mass % |  | 60 | 60 | 60 | 60 | 60 |
| (Evaluation 1) Low-temperature curability |  |  | X | ◎ | ◎ | X | X |
| (Evaluation 2) Adhesion to upper-layer coating film |  |  | ◎ | X | X | ○ | ◎ |
| (Evaluation 3) Compatibility with polyols |  |  | ○ | X | X | ○ | ○ |
| (Evaluation 4) Hardness of coating film |  |  | X | ○ | ○ | X | X |

From the results, it was at least found that each of the blocked polyisocyanate compositions of Examples has excellent adhesion to an upper-layer coating film and excellent compatibility with polyols. In addition, a coating film having good low-temperature curability and excellent hardness was successfully obtained by using a one-component coating composition containing each of the blocked polyisocyanate compositions of Examples.

The present application is based on a Japanese patent application (Japanese Patent Application No. 2016-065941)

filed with the Japanese Patent Office on Mar. 29, 2016, the contents of which are incorporated herein by reference.

INDUSTRIAL APPLICABILITY

The blocked polyisocyanate composition and one-component coating composition according to the present invention can be used as a starting material for a coating material, an ink, an adhesive, a casting agent, an elastomer, a foam, and a plastic material. In particular, the blocked polyisocyanate composition and one-component coating composition according to the present invention can be suitably used for a coating material for automobiles, a coating material for household electrical appliances, and a coating material for information apparatuses such as personal computers and mobile phones.

The invention claimed is:

1. A blocked polyisocyanate composition comprising a blocked polyisocyanate formed through blocking at least a part of isocyanate groups possessed by a polyisocyanate derived from one or two or more diisocyanates selected from the group consisting of an aliphatic diisocyanate and an alicyclic diisocyanate with an active methylene-based compound comprising a malonic acid diester, wherein a specific molar ratio represented by formula (1) is 0.05 or more and 0.60 or less:

specific molar ratio=$(B+C+D)/(A+B+C+D)$    (1)

wherein A represents a content (mol %) of isocyanurate groups represented by formula (I); B represents a content (mol %) of iminooxadiazinedione groups represented by formula (II); C represents a content (mol %) of uretdione groups represented by formula (III); and D represents a content (mol %) of allophanate groups represented by formula (IV),

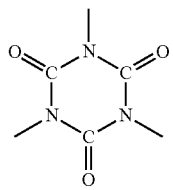

(I)

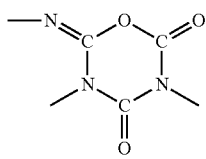

(II)

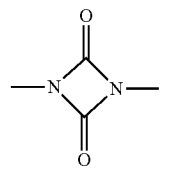

(III)

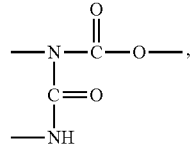

(IV)

and a monohydric alcohol selected from the group consisting of methanol, ethanol, n-propanol, isopropanol, n-butanol, isobutanol, 2-butanol, t-butanol, n-amyl alcohol, isoamyl alcohol, 2-methyl-1-butanol, n-hexanol, 2-methyl-1-pentanol, 2-ethyl-1-butanol, n-heptanol, n-octanol, and 2-ethyl-1-hexanol, and wherein the monohydric alcohol is in an amount of 10 eq % or more and 500 eq % or less of blocked isocyanate groups.

2. The blocked polyisocyanate composition according to claim 1, wherein the diisocyanates comprise hexamethylene diisocyanate.

3. A one-component coating composition comprising the blocked polyisocyanate composition according to claim 1, and a polyvalent active hydrogen compound.

4. A coating film formed of the one-component coating composition according to claim 3.

5. A coated article comprising the coating film according to claim 4.

6. A method for producing a composite coating film, the method comprising:

coating with a first coating material solution comprising the one-component coating composition according to claim 3 to form a first coating film; and coating the first coating film with a second coating material solution to form a second coating film.

7. A composite coating film comprising a first coating film formed of the one-component coating composition according to claim 3, and a second coating film on the first coating film.

* * * * *